US012659051B2

(12) United States Patent
Yang et al.

(10) Patent No.: US 12,659,051 B2
(45) Date of Patent: Jun. 16, 2026

(54) METHOD AND APPARATUS FOR MULTIPLE-INPUT MULTIPLE-OUTPUT (MIMO) TESTING USER EQUIPMENT (UE)

(71) Applicant: Keysight Technologies, Inc., Santa Rosa, CA (US)

(72) Inventors: Huaizhi Yang, Beijing (CN); Ya Jing, Beijing (CN); Jin-Ming Zhao, Beijing (CN); Zi Quan Bai, Beijing (CN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 291 days.

(21) Appl. No.: 18/374,053

(22) Filed: Sep. 28, 2023

(65) Prior Publication Data

US 2024/0171291 A1 May 23, 2024

Related U.S. Application Data

(60) Provisional application No. 63/428,451, filed on Nov. 29, 2022.

(30) Foreign Application Priority Data

Nov. 21, 2022 (CN) .......................... 202211455227.6

(51) Int. Cl.
*H04B 17/00* (2015.01)
*H04B 17/15* (2015.01)
*H04B 17/309* (2015.01)

(52) U.S. Cl.
CPC ....... *H04B 17/0085* (2013.01); *H04B 17/191* (2023.05); *H04B 17/309* (2015.01)

(58) Field of Classification Search
CPC .......................... H04B 17/0085; H04B 17/191; H04B 17/309; H04B 17/0087; H04B 17/347
USPC ....................................................... 455/67.14
See application file for complete search history.

(56) References Cited

U.S. PATENT DOCUMENTS

| | | | | |
|---|---|---|---|---|
| 9,432,080 B2 * | 8/2016 | Schenk | .................... | H04B 3/32 |
| 9,488,685 B2 | 11/2016 | Kyosti et al. | | |
| 2015/0138026 A1 * | 5/2015 | Shay | .................... | H04B 17/12 |
| | | | | 343/703 |
| 2017/0373773 A1 * | 12/2017 | Jing | .................... | H04B 17/102 |
| 2020/0213883 A1 * | 7/2020 | Kong | .................... | H04W 72/542 |

(Continued)

OTHER PUBLICATIONS

Fengchun Zhang et al., "Achieving Wireless Cable Testing of High-Order MIMO Devices With a Novel Closed-Form Calibration Method," IEEE Transactions on Antennas and Propagation, vol. 69, No. 1, Jan. 2021, pp. 478-487.

(Continued)

*Primary Examiner* — Don N Vo

(57) ABSTRACT

A system, device and method for optimization of a radiated transmission matrix by the selecting probe antennae and applying a compensation network in the test system are described. Among other benefits, the anechoic chamber in which the DUT is disposed is comparatively small and inexpensive. The time-consuming process of inverse matrix tuning or isolation level checking that plagues known systems, device and methods of testing DUT is substantially avoided. Because of small size of shield box and probe antenna selection algorithm, low path loss and acceptable power in testing can be realized.

20 Claims, 5 Drawing Sheets

(56) References Cited

U.S. PATENT DOCUMENTS

2020/0382172 A1    12/2020  Sethuraman et al.
2022/0163579 A1*    5/2022  Li  ..................... G01R 29/0878

OTHER PUBLICATIONS

Yusheng Zhang et al., "Multi-probe Linear Matrix Inversion Method in Sub-array Internal Element Calibration," 2022 16th European Conference on Antennas and Propagation (EuCAP), Madrid, Spain, 2022, pp. 1-5.

* cited by examiner

<u>200</u>

System initiation for calibration
- To set UXM 5G with calibration configuration (LTE/NR)
- To open calibration model file in FS16
- To control DUT remotely for calibration test                    ⟋ 202

Capture DUT status with specific CRC test set-up                  ⟋ 204

Generate Calibration Matrix                                       ⟋ 206

Implement Test of UE                                              ⟋ 208

METHOD AND APPARATUS FOR MULTIPLE-INPUT MULTIPLE-OUTPUT (MIMO) TESTING USER EQUIPMENT (UE)

CROSS-REFERENCE TO RELATED APPLICATION

The present application claims priority under 35 U.S.C. § 119(e) and from commonly owned Chinese Patent Application No. 202211455227.6, filed on Nov. 21, 2022. The present application also claims priority under 35 U.S.C. § 119(e) and from commonly owned U.S. Provisional Application No. 63/428,451 filed on Nov. 29, 2022. The entire disclosures of Chinese Patent Application No. and U.S. Provisional Application No. 63/428,451 are specifically incorporated herein by reference in their entirety.

BACKGROUND

Wireless equipment is ubiquitous in today's society. Many different devices benefit from wireless communication including mobile phones and mobile computers, just by way of example. As will be appreciated, these mobile devices (also referred to as user equipment (UE) must be tested during development and prior to distribution. Known functional test of wireless devices often is performed in with cables connected to test ports of the device under test (DUT).

Making the connections to the UEs is already taxing, particularly in view of the comparatively large number of communication protocols that are contemplated for use in each UE. Moreover, with increasingly complex UEs, the number of antennae provided in each phone to support multiple frequency bands and MIMO technology has also been increasing. As can be appreciated, testing of a DUT with current cable-connection testing technology is becoming increasingly complicated and difficult. For example, even if there were multiple test ports on a standard UE, attaching radio frequency (RF) connectors to the UE would be labor intensive and prone to errors and breakage. Moreover, certain UEs have integrated antennae and chipsets, and cannot be coupled to RF connectors, rendering the use of traditional cable-conducted testing not an option. Furthermore, with the emergence of long term evolution (LTE) and new radio (NR) technologies, current UEs are called on to support multiple bands or carriers resulting in many possible band combinations. Plainly, testing these complex technologies would require a large number of RF cables and connector from the emulator to the UE.

In addition to the above-mentioned shortcomings in MIMO testing UEs, known over-the-air (OTA) test equipment requires comparatively large test chambers and complicated and time-consuming calibration prior to the initiation of any test procedure. Among other drawbacks, the known OTA test equipment and methods add to the overall cost of the test regimen, among other drawbacks. Just by way of illustration, far-field based standard MIMO over the air (OTA) test systems are very expensive and cumbersome in size (e.g., 5 meter×5 meter×5 meter), leading to test logistics and lack of portability.

What is needed, therefore, is a system, device and method for testing MIMO UEs that overcome at least the drawbacks of known devices described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
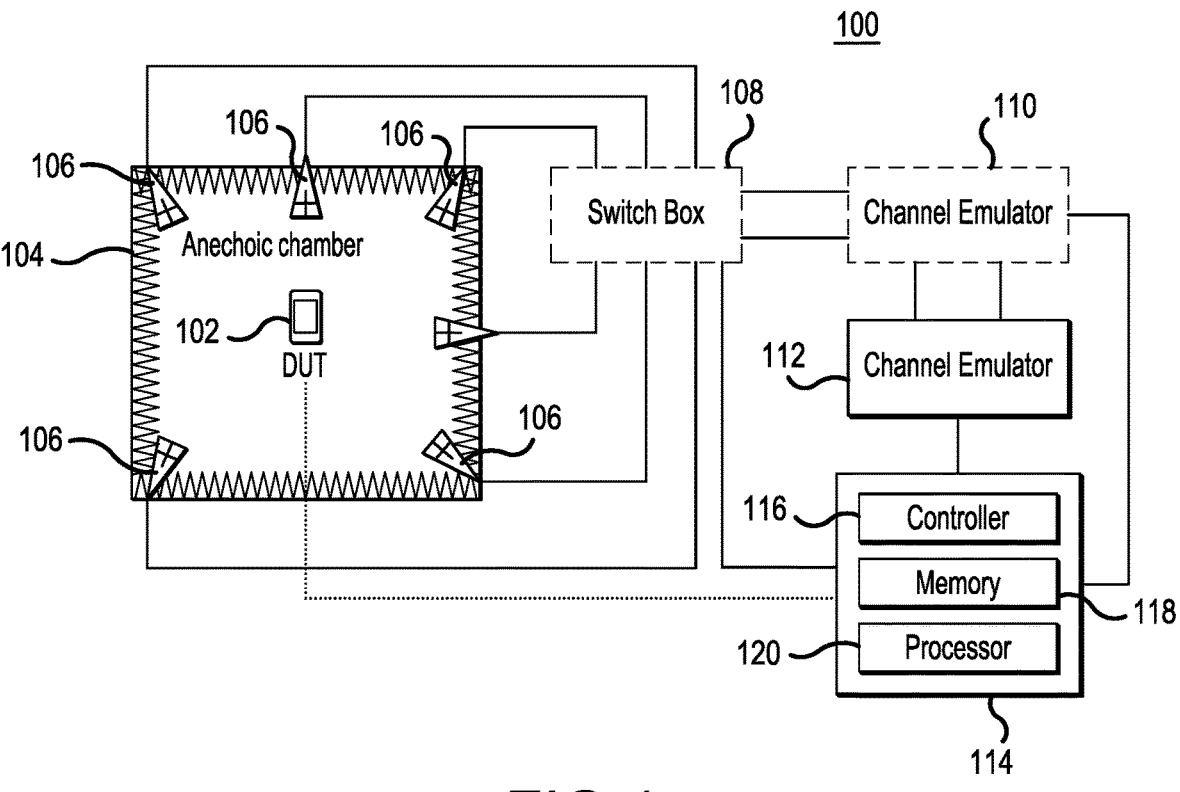
FIG. 1 is a simplified block diagram showing system for MIMO testing of a UE in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, the present teachings provide a system, device and method for optimization of a radiated transmission matrix by the selection of probe antennae and applying compensation network in the test system. Among other benefits, the anechoic chamber in which the DUT is disposed is comparatively small and inexpensive. The time-consuming process of inverse matrix tuning or isolation level checking that plagues known systems, device and methods of testing DUT can be substantially avoided. Because of small size of shield box and probe antenna selection algorithm, low path loss and acceptable power in testing can be realized. As such, and without complex RF cable connector assembling that plagues known techniques, a number of functional tests can be performed with good dynamic range and fast speed. Furthermore, owing to the comparatively small size of the anechoic chamber of the representative embodiments, the distance between the probe antennae and the DUT is comparatively short resulting in lower free-space loss and little or no need for additional power boost such as power amplifiers (PA). In addition, the placement of probe antennae inside the anechoic chamber beneficially reduces the spatial correlation of each probe antenna. These and other benefits to the field of testing wireless UE's result in multiple band combination testing and testing using base stations (BTS) or BTS simulators in a comparatively small space.

In accordance with a representative embodiment, an apparatus for testing a wireless device is disclosed. The apparatus comprises a test fixture adapted to receive the wireless device, the text fixture comprising N probe antennas, where N is a positive integer. The apparatus further comprises a channel emulator or switch box adapted to provide test signals to probe antennas, a user interface adapted to select a subset L of the N probe antennas; a processor; and a memory that stores instructions. When executed by the processor, the instructions cause the processor to: determine a transmission matrix for L e DUT antennas and the N probe antennas; apply a cost function for each transmission matrix;

select a transmission matrix based on the cost function; and perform a test on the wireless device of a selected metrics.

In accordance with another representative embodiment, a tangible, non-transitory computer readable medium that stores instructions for testing a wireless device is described. When executed by a processor, the instructions cause the processor to: determine a transmission matrix for a subset L of N probe antennas; apply a cost function for each transmission matrix; select a transmission matrix based on the cost function; and perform a test on the wireless device of a selected metrics.

FIG. 1 is a simplified block diagram showing system 100 for testing UE 102 (also referred to herein as DUT 102) disposed in an anechoic chamber 104 in accordance with a representative embodiment. As will be appreciated by one of ordinary skill in the art having the benefit of the present disclosure, the UE is a mobile phone adapted to function according to one of a number of wireless networks including Generation 5 (5G), Generation 6 (6G) and their progeny, and according to one of a number of known wireless transmission protocols. Generally, the testing UE 102 is adapted for multiple-input multiple-output (MIMO) (e.g., 4×4) communications and comprises a commensurate number of antennae to effect these different communications.

The anechoic chamber 104 is illustratively referred to as a cable replacement cube (CRC) and is comparatively small in size and volume. Notably, and beneficially, the anechoic chamber 104 can be a comparatively small cube with volume of 80 cm×80 cm×80 cm, while the size for traditional MIMO OTA chambers is at least several meters in each of three dimensions. As such, the systems of the present teachings beneficially render known cable-connection tests to a great extent obsolete. The anechoic chamber 104 comprises a plurality of probe antennae 106 that functions as an antenna subsystem and are used in the testing of the UE 102. In the representative embodiment of FIG. 1, there are six (6) probe antennae 106 with dual polarizations. Notably, this is merely illustrative, and more or fewer than six probe antennae 106 are contemplated by the present teachings. Notably, the anechoic chamber 104 comprises absorber material. As noted below, a channel emulator is used to calibrate the system 100 with test signals from a BTS or BTS emulator are transmitted to the probe antennae 106 through a channel emulator.

The probe antennae 106 are connected to a switch box 108. The switch box 108 is connected to a channel emulator 110, a base station emulator 112, and a computer 114. As described more fully below, based on certain computations, the computer sends commands to the switch box 108 to selectively connect the probe antennae 106 to carry out tests based on emulation by the base station emulator 112 and the channel emulator 110.

Table 1 below provides illustrative numbers of probe antennae. In one example, for single band 4×4 MIMO test, a total of four test signals are provided from BTS or BTS simulator. Assuming the probe antennae are single-polarized a minimum of four (4) probe antennas are placed in the anechoic chamber 104. By contrast, when using dual-polarized probe antennae require a minimum of two probe antennae 106 are placed in anechoic chamber 104. Table 1 provides the minimum number of probe antennae 106 based on antennae polarization and bands under test.

TABLE 1

| Min. number of probe antennas | 1-band | | 2-band | | 3-band | |
|---|---|---|---|---|---|---|
| in CRC | 2 × 2 | 4 × 4 | 2 × 2 | 4 × 4 | 2 × 2 | 4 × 4 |
| Single-polarized probe antenna | 2 | 4 | 4 | 8 | 6 | 12 |
| Dual-polarized probe antenna | 1 | 2 | 2 | 4 | 3 | 6 |

In a representative embodiment, the channel emulator 110 is a commercially available test system such as the S8820A PROPSIM FS16 Channel Emulation Toolset available from Keysight Technologies, Santa Rosa, CA (USA). The channel Keysight's enables you to perform in-lab benchmarking of devices, base stations, digital radios. The channel emulator 110 is adapted for unidirectional and bidirectional operation testing systems using 5G Device MIMO and MIMO OTA fading tests, 5G Base station MIMO or uplink only Massive MIMO tests, WLAN 802.11ax access points and devices, Automotive wireless connectivity validation, WLAN 802.11ax access point and client testing.

In a representative embodiment, the base station emulator 112 is a commercially available test system such as the E7515B UXM 5G wireless test solution available from Keysight Technologies, Santa Rosa, CA (USA). The channel emulator is a comparatively highly-integrated signaling test platform with multiformat stack support, suitably processing power, and RF resources for testing current UEs. Just by way of illustration different 5G New Radio (NR) deployment modes; non-stand-alone (NSA), stand-alone (SA), and frequency bands FR1 and FR2. The solution performs signaling test for device RF characteristics, protocol compliance, and functional key performance indicators. It also supports LTE, eMTC and C-V2X signaling formats.

The system 100 also comprises a computer 114, which includes a controller 116. The controller 116 described herein may include a combination of a memory 118 that stores instructions and an illustrative processor 120 that executes the instructions in order to implement processes described herein. The controller 116 may be housed within or linked to a workstation such as the computer 114 or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller(s), slot(s) and port(s).

Additionally, although the computer 114 and/or the controller 116 shows components networked together, two such components may be integrated into a single system. For example, the computer 114 and/or the controller 116 may be integrated with a display (not shown) and/or with the system

100. On the other hand, the networked components of the computer 114 and/or the controller 116 may also be spatially distributed such as by being distributed in different rooms or different buildings, in which case the networked components may be connected via data connections. In still another embodiment, one or more of the components of the computer 114 and/or the controller 116 is not connected to the other components via a data connection, and instead is provided with input or output manually such as by a memory stick or other form of memory. In yet another embodiment, functionality described herein may be performed based on functionality of the elements of the computer 114 and/or the controller 116 but outside the system 100.

The computer 114 and/or the controller 116 may be implemented as a processing unit. In various embodiments, the processing unit may include one or more computer processors (e.g., processor 120), digital signal processors (DSP), field-programmable gate arrays (FPGAs), application specific integrated circuits (ASICs), or combinations thereof, using any combination of hardware, software, firmware, hard-wired logic circuits, or combinations thereof.

The computer 114 and/or the controller 116 may include its own processing memory (e.g., memory 118) for storing computer readable code (e.g., software, software modules) that enables performance of the various functions described herein. For example, the processing memory may store software instructions/computer readable code executable by the processor 120 for performing some or all aspects of methods described herein, including various steps of the method described below with reference to FIGS. 2-3. That is, execution of the instructions/computer readable code generally causes the processor 120 of the computer 114 and/or the controller 116 to emulate signals in a MIMO test of the testing UE 102 as described herein. A computer readable medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. Memories (and databases) as described herein may be RAM, ROM, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

Figure 2:
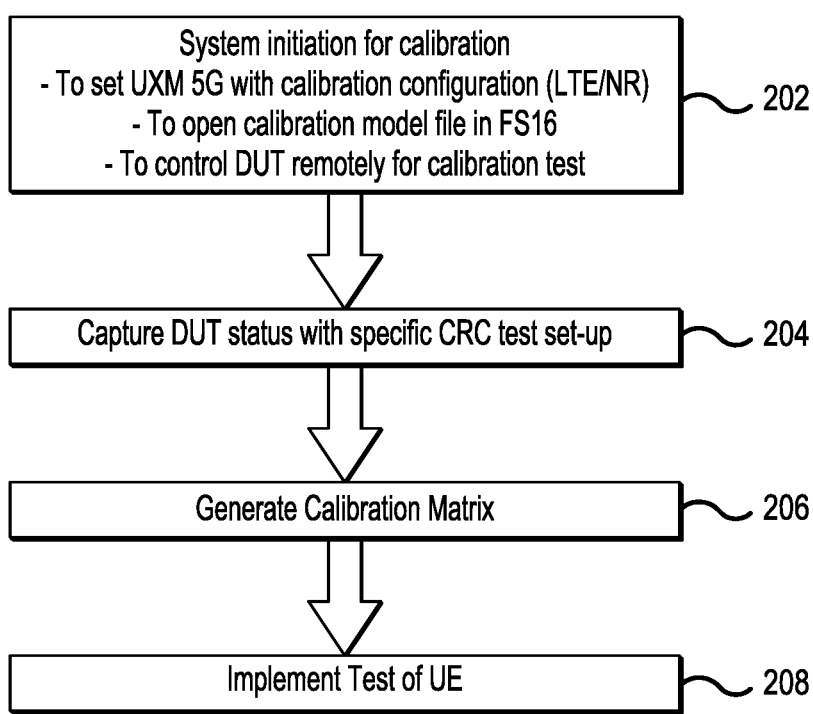
FIG. 2 is a flow-chart of a method for MIMO testing of UE in accordance with a representative embodiment.

FIG. 2 is a flow-chart of a method 200 for MIMO testing of UE in accordance with a representative embodiment. Various aspects and details of the method 200 are common to those described above in connection with the representative embodiments of FIG. 1. These common aspects and details may not be repeated to avoid obscuring the description of the presently described representative embodiments.

At 202 the method 200 begins with the test initiation. In this portion of the method, initial calibration of the system 100 is carried out. This may be used to set the channel emulator 110 and base station emulator 112 calibration. Specifically, and again by way of illustration, the base station emulator 112 is set for the desired protocol (e.g., UXM 5G) with a calibration configurations, such as LTE or NR. Moreover, a calibration model file in the channel emulator 110 is opened. Again, just by way of illustration, the channel emulator is the above-described FS16. The actions at 202 also comprise setting up the DUT 102 for a remote calibration tests. These actions in 202 are within the purview of one of ordinary skill in the art.

At 204 the method 200 continues with determination of the status of the DUT 102 with a specific test setup with the system 100. The determination of the status comprises sending a test signal from probe antennae in sequence and capturing the received power from DUT 102.

At 206 the method 200 continues with the generation of a transmission matrix. Specifically, and as described more fully below, a matrix is selected based on determined parameters including the sum of the eigenvalues and the condition number of the selected transmission matrix. The cost function is a function with two parameters of a condition number and a sum of eigenvalues of the transmission matrix. This means the cost function is determined by the condition number and sum of eigenvalues jointly, not by only one of them. In accordance with a representative embodiments, the cost function $F(x1, x2)$ is defined as below (where 0.8, 0.2 are illustrative and can be changed them to other values according to a specific test condition). Notably parameter x1 is a condition number of a transmission matrix, parameter x2 is equal to the sum of the eigenvalues of the transmission matrix, and z0 is the maximum number of sum of eigenvalues for all the transmission matrices:

$$\text{Cost Function: } F(x1,x2)=0.8*x1+0.2*(z0-x2)$$

Notably, for each transmission matrix, one cost function number can be calculated based on this Cost Function definition. The transmission matrix that provides the lowest cost function number is the optimal transmission matrix, and the probe antennas corresponding to this optimal transmission matrix are the selected probe antennas for the test case.

As described more fully below, the transmission matrix having the greatest sum of eigenvalues and the smallest condition number is selected to determine which of the plurality of probe antennae 106 are to be used in a particular test of received power by the DUT 102. Notably, the transmission matrix having the greatest sum of eigenvalues is indicative of the combination of the plurality of probe antennae 106 that provides the greatest received power and the lowest path loss by the DUT 102 from the emulated signals. As such, the transmission matrix is constructed based on the received power by the DUT 102 with the signal transmitted by selected ones of the plurality of probe antennae 106 that provide the greatest sum of eigenvalues of the transmission matrix, which is a good indicator that the DUT 102 will receive comparatively high received power.

Furthermore, the selected transmission matrix is also the matrix that provides the lowest condition number, which is the ratio of the greatest eigenvalue to the smallest eigenvalue of the transmission matrix. As is known, the condition number of a function is a measure of how much the output value of the function can change for a small change in the input argument. This is used to measure how sensitive a function is to changes or errors in the input, and how much error in the output results from an error in the input.

The condition number is an application of the mathematical derivative operator, and is formally defined as the value of the asymptotic worst-case relative change in output for a relative change in input. The "function" is the solution of a problem and the "arguments" are the data in the problem.

The condition number is frequently applied to questions in linear algebra, in which case the derivative is straightforward but the error could be in many different directions, and is thus computed from the geometry of the matrix. More generally, condition numbers can be defined for non-linear functions in several variables.

A problem with a low condition number is said to be well-conditioned, while a problem with a high condition number is said to be ill-conditioned. In non-mathematical terms, an ill-conditioned problem is one where, for a small change in the inputs (the independent variables) there is a large change in the answer or dependent variable. This means that the correct solution/answer to the equation becomes comparatively difficult to determine. The condition number is a property of the problem. Paired with the problem are any number of algorithms that can be used to solve the problem, that is, to calculate the solution.

As alluded to above, the instructions stored in memory cause the processor to select an optimal transmission matrix from the determined transmission matrices for the selected test. The optimal transmission matrix is illustratively carried out to determine a cost function for each transmission matrix based on the condition number of the transmission matrix and a sum of eigenvalues. The optimal transmission matrix has the lowest cost function.

Finally, at 208, after the determination of the optimal transmission matrix is carried out, a test of the DUT 102 is carried out using the selected ones of the plurality of antennae that provide the lowest cost function for the particular test being effected.

Figure 3:
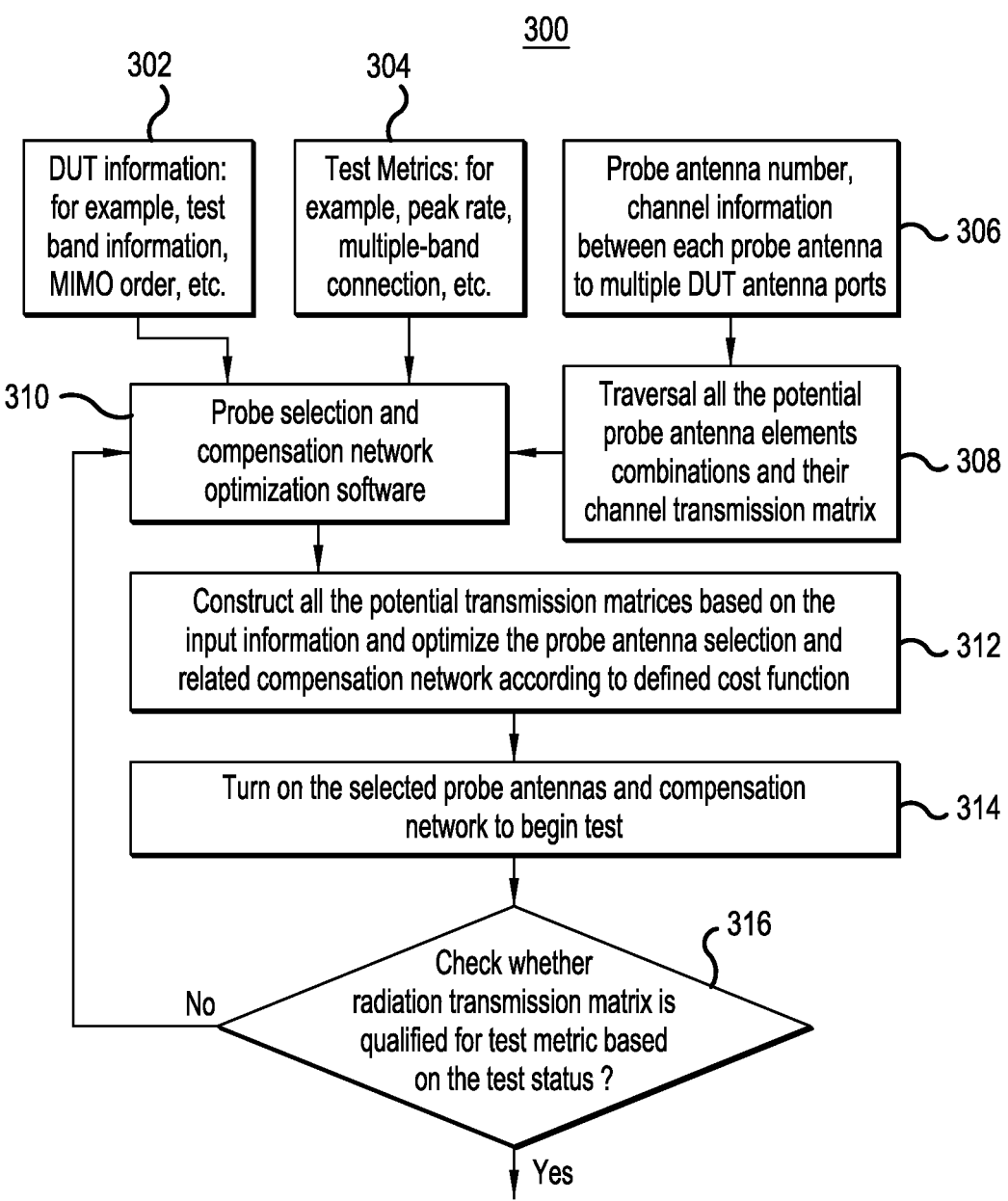
FIG. 3 is a flow-chart of a method for optimizing the selection of probe antennae for a test in accordance with a representative embodiment.

FIG. 3 is a flow-chart of a method 300 for optimizing the selection of probe antennae for a test in accordance with a representative embodiment. Various aspects and details of the method 300 are common to those described above in connection with the representative embodiments of FIGS. 1 and 2. These common aspects and details may not be repeated in order to avoid obscuring the presently described representative embodiments.

At 302, the method begins with input of relevant information of the DUT 102. For example, the test band of operation of the DUT 102 is provided to the controller 116 from for storage in memory 118 based on prompts on the display of the computer 114.

At 304 desired test metrics for the test are provided. For example, the peak transmission rate, multiple band connections and similar metrics are provided to the controller 116 from for storage in memory 118 based on prompts on the display of the computer 114.

At 306, the number of the plurality of probe antennae 106 and channel response information between each probe antenna to multiple DUT antennas are also provided. For example, inputs including other DUT information are provided to the controller 116 from for storage in memory 118 based on prompts on the display of the computer 114.

At 308 traversal of all the potential probe antenna elements combinations and their channel transmission matrices are carried out. In a representative embodiment, a test signal is sent out from probe antennas in predetermined sequence, and the received power number for each RF port is recorded in this process. The channel transmission matrices are constructed based on the recorded power information.

By performing these operations before testing the DUT 102, channel response information between the plurality of probe antennae 106 and the antennae of the DUT 102 can be gathered. Based on all these input parameters, analysis is performed according to aspects of the method according to a defined cost function. At 310, the method determines the best probe antenna element combination and compensation network if further compensation is necessary for the next step test.

At 312, the method 300 comprises constructing possible transmission matrices based on the input information provided to the computer 114 by the user. The method then selects the various ones of the plurality of probe antennae and any related compensation networks according to a defined cost function, which is described more fully below.

At 314, the method comprises engaging the selected probe antennae 106 and compensation network to begin a test of the DUT.

At 316 after the test under the selected configuration is carried out, the results are compared with the predicted or expect results. If at 316 the answer is 'YES,' the test is completed; and if 'NO,' the method returns to 310 for another round optimization. Proper criteria are set to stop the loop with several rounds' optimization. In accordance with a representative embodiment, at 310, the Cost Function valued described above is determined for each transmission matrix construed in 308 and find the transmission matrix with lowest cost function number. The probe index corresponding to this transmission matrix with lowest cost function is the selected probe antennas, Referring again to 310, further details of the construction of possible matrices and the selection of the optimal transmission matrix for a given test. This is carried out with illustrative guidance described presently.

First, it is desirable to provide a flat frequency response over test bandwidth in the test zone is preferred. The multipath can be relieved by covering absorb materials in the anechoic chamber 104 to keep the test environment clean. The environment in the test zone can be validated by measuring frequency response using vector network analyzer (VNA), if the frequency response is flat over test bandwidth, and no significant multipath appears in the test zone. The method 300 for selecting the desired transmission matrix should avoid selecting the probe antennas which cause severe frequency selectivity channel.

Second, the transmission matrix selected for engaging the probe antennae 106 to communicate with the DUT 102 should not be ill-conditioned. As such, and as alluded to above, eigenvalue and condition number analysis are carried out on the transmission matrices between selected probe antennas and DUT tested antennas, only when the transmission matrix is in good condition with small condition number should be used. The selected transmission matrix will not significantly impact input multiple streams' correlation level and keep the test results close with the cable-conducted test. The transmission matrix with large condition number introduces high correlation on the MIMO signals, which will degrade the test performance. This performance degradation is not DUT's real performance, but introduced by test environment, and as such, ill-conditioned transmission matrices should be avoided as much as possible by CRC algorithm picking the proper probe antennas.

Third, the path loss should not be too great. Specifically, although the test distance between the selected ones of the plurality of probe antennae 106 to the DUT 102 is shorter compared traditional OTA chamber, link budget (path loss) is an important factor to be considered. The probe antennae orienting almost DUT's nulling direction of all antennas under test should be excluded from the option set by CRC algorithm.

In accordance with the presently-described representative embodiment, twelve (12) probe antennae 106 and four DUT 102 are chosen to illustrate how the method optimizes the selection of probe antennae for a particular test, while selected a transmission matrix that is not ill-conditioned, but rather is well-conditioned, and the path loss is kept below a desired amount While the path loss values for different DUTs differ, the path loss is selected to be in a range that provides a stable communications connection between the base station emulator and the DUT 102 to facilitate testing. The noted one round optimization process can be implemented according to the illustrative steps described below. However, it is emphasized that other methods to select the proper condition number, sum of eigenvalues and cost function based on the presently described representative embodiments.

Figure 4:
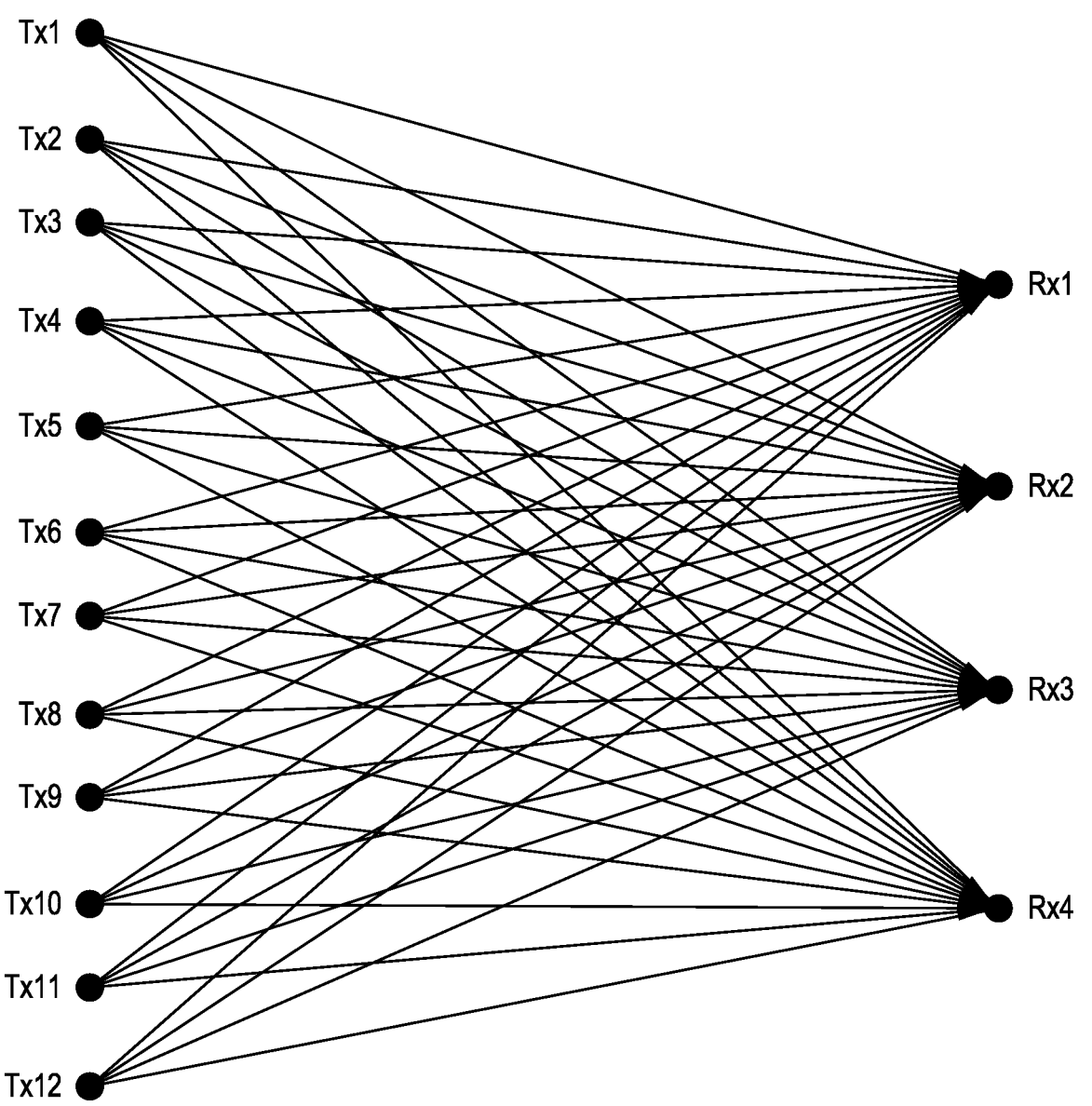
FIG. 4 possible combinations of connections of twelve (12) probe (TX) antenna and four (4) DUT (RX) antennae in accordance with a representative embodiment.
Figure 5:
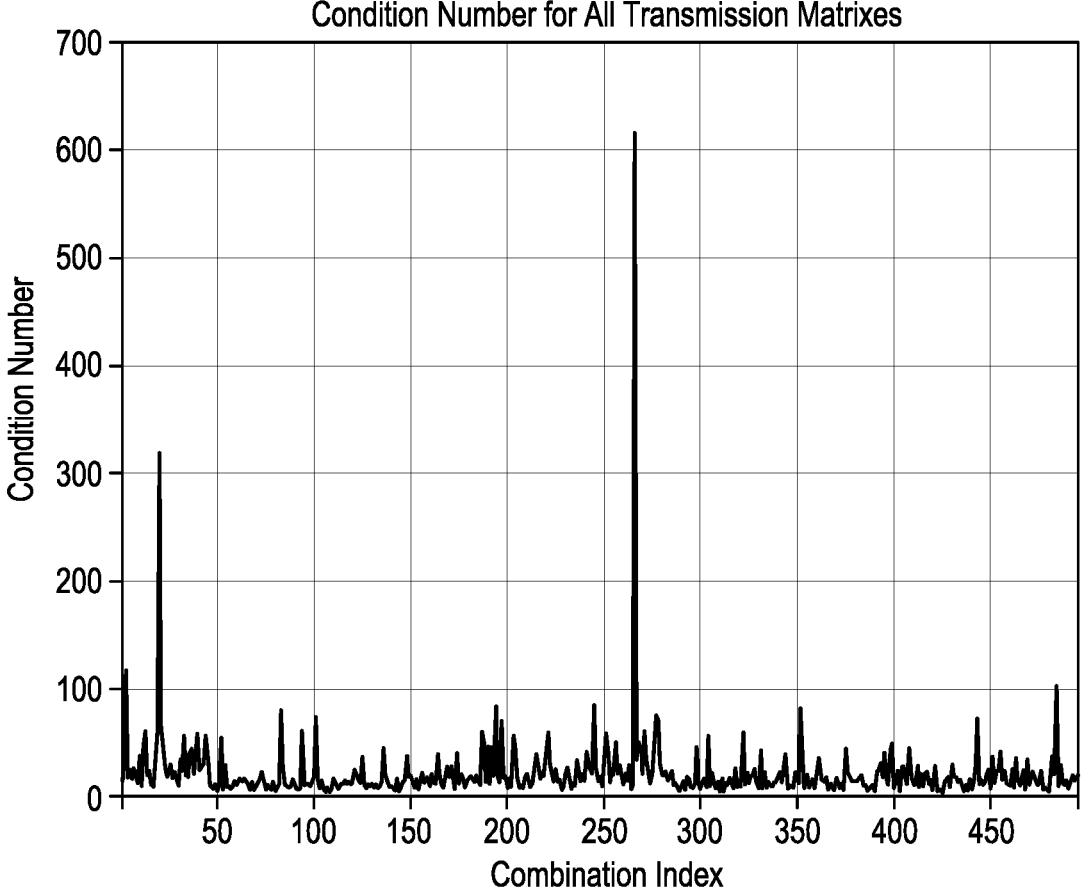
FIG. 5 is a graph showing the conditional numbers for 495 transmission matrices, in accordance with a representative embodiment.

An initial test is carried out by turning on each of the plurality of probe antennae sequentially at a time and the received power (e.g., received signal strength (RSSI) or reference signal received power (RSRP)) from the DUT 102 is used to estimate channel response between $i^{th}$ Tx probe antenna 106 and four Rx antennae of the DUT. The relative phase between two different Tx ports also can be estimated by tuning on both two Tx RF ports from the base station emulator together at the same time and multiple time receive power measurement. Then the overall transmission matrix in dimension of 4×12 is constructed as shown in FIGS. 3 and 4. Specifically, FIG. 3 shows conditional numbers for all 495 transmission matrix combinations in the representative test, and FIG. 4 plots its condition numbers cumulated distribution function. Plainly, based on FIG. 4, there are some ill-conditioned transmission matrices that result from combinations the plurality of probe antennae 106, which should be avoided because of too large condition number.

Next, and continuing with the present example, a combination of four of twelve columns of a transmission matrix is selected from the overall possible combinations of a 4×4 transmission matrix (C(12, 4)=495 as noted above. These 495 transmission matrices are listed and the sum of their respective eigenvalues and condition numbers are determined After the determination of transmission matrices is complete, a cost function is defined to evaluate the quality of transmission matrix including condition number and sum of eigenvalues at the same time. As alluded to above, the condition number is one quality indicator for MIMO transmission—a transmission matrix with a comparatively low condition number is said to be well-conditioned, while a transmission matrix with a high condition number is said to be ill-conditioned. The transmission matrix with a low condition number is preferred to be selected following the noted benefit of not selecting a transmission matrix for engaging the probe antennae 106 to communicate with the DUT 102 that is not ill-conditioned.

The sum of eigenvalues is another indicator for radiation path loss as noted above. A transmission matrix with comparatively high sum of eigenvalues is said to have low path loss, which is preferred to be selected the third noted rule above. Different weights can be assigned to these two factors of condition number and sum of eigenvalues in the cost function based on the exact test case and link power requirement. As such, according to a representative embodiment, all the selections of 4 columns from 12 columns, and each 4 selected columns are used to construct one 4×4 matrix, with the condition number and sum of eigenvalues being used to determine if the combination of the plurality of probe antennae 106 would provide an adequate amount of received power and comparatively low path loss.

Finally, a cost function is determined for each transmission matrix according to the third guideline above—the path loss should not be too great. The combination of selected probe antennae 106 that provides a lowest cost function is beneficially selected, and the column's index in the overall 4×12 transmission matrix corresponds to probe antenna index. The selected 4×4 transmission matrix constitutes the real test environment in the subsequent test. Just by way of illustration, an illustrative cost function can be represented by:

As noted above, the Cost Function=f1(condition number)+f2(sum of eigenvalues), where f1 and f2 are linear functions for condition number and sum of eigenvalues separately. Following this function a Cost Function for each matrix can be determined and compared to determine the best matrix (lowest cost function) that can be selected. Notably, the selected matrix's column index in the original large matrix with 12 columns corresponds to the selected probe antenna's index.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An apparatus for testing a wireless device, comprising:
a test fixture adapted to receive the wireless device, the text fixture comprising N probe antennas, wherein N is a positive integer;
a channel emulator adapted to provide test signals to M test antennae, wherein M is a positive integer;
a user interface adapted to select a subset L of the M test antennas, wherein L is a positive integer;
a processor;
a memory that stores instructions, which when executed by the processor, cause the processor to:
determine a transmission matrix for the subset L test antennas and the N probe antennas;
apply a cost function for each transmission matrix;
select a transmission matrix based on the cost function; and
perform a test on the wireless device of selected metrics.

12

2. The apparatus of claim 1, wherein the test is over the air (OTA) and no cables are connected to the wireless device.

3. The apparatus of claim 1, wherein the instructions further cause the processor to select an optimal transmission matrix from the determined transmission matrices for a selected test.

4. The apparatus of claim 3, wherein the optimal transmission matrix is selected based on a test metrics.

5. The apparatus of claim 4, wherein test parameter comprises one or more of a peak rate, a multi-band connection, cell switch, throughput under channel models, and throughput versus signal to interference to noise ratio (SINR).

6. The apparatus of claim 3, wherein the instructions further cause the processor, when determining the optimal transmission matrix, to determine the cost function for each transmission matrix based on a condition number of the transmission matrix and a sum of eigenvalues.

7. The apparatus of claim 6, wherein the condition number comprises a ratio of a highest eigenvalue of each transmission matrix to a lowest eigenvalue of each transmission matrix.

8. The apparatus of claim 3, wherein the instructions further cause the processor, when determining the optimal transmission matrix, to determine the cost function based on a condition number and a sum of eigenvalues of each transmission matrix.

9. The apparatus of claim 1, wherein the instructions further cause the processor to select the transmission matrix with a lowest cost function number.

10. The apparatus of claim 1, wherein the instructions further cause the processor to select the transmission matrix having a lowest condition number and a highest number of sum of eigenvalues.

11. A tangible, non-transitory computer readable medium (CRM) that stores instructions for testing a wireless device, wherein when executed by a processor, the instructions cause the processor to:
determine a transmission matrix for a subset L of test M antennae and N probe antennas, wherein L, M and N are positive integers;
apply a cost function for each transmission matrix;
select a transmission matrix based on the cost function; and
perform a test on the wireless device of selected metrics.

12. The CRM of claim 11, wherein the test is over the air (OTA) and no cables are connected to the wireless device.

13. The CRM of claim 11, wherein the instructions further cause the processor to select an optimal transmission matrix from the determined transmission matrices for the selected test.

14. The CRM of claim 13, wherein the optimal transmission matrix is selected based on a test metrics.

15. The CRM of claim 14, wherein a test parameter comprise one or more of a peak rate, a multi-band connection and throughput versus signal to interference to noise ratio (SINR).

16. The CRM of claim 13, wherein the instructions further cause the processor, when determining the optimal transmission matrix, to determine the cost function for each transmission matrix based on a condition number and a sum of eigenvalues of the transmission matrix.

17. The CRM of claim 16, wherein the condition number comprises a ratio of a highest eigenvalue of each transmission matrix to a lowest eigenvalue of each transmission matrix.

18. The CRM according to claim 17, wherein the instructions further cause the processor to select the transmission matrix with a lowest cost function number.

19. The CRM according to claim 11, wherein the instructions further cause the processor to select the transmission matrix with a lowest a lowest condition number and a highest number of sum of eigenvalues.

20. The CRM of claim 13, wherein the instructions further cause the processor, when determining the optimal transmission matrix, to determine the cost function based on a condition number and a sum of eigenvalues of each transmission matrix.

* * * * *